INVENTORS:
JEAN VAN IMPE
PIERRE EMILE CHAUSSONNET
JEAN P. M. ROMBAUX
By
Breitenfeld & Levine
ATTORNEYS

United States Patent Office 3,679,378
Patented July 25, 1972

3,679,378
PROCESS FOR SEPARATING THE CORE OF A TUBULAR NUCLEAR FUEL ELEMENT
Jean Van Impe, St. Genese, Belgium, Pierre E. Chaussonnet, Sceaux, France, and Jean-Pierre M. Rombaux, Grimbergen, Belgium, assignors to ENI-L'Electro-Navale & Industrielle, Anvers, Belgium, and S.E.P.I., Saint-Denis, France
Filed July 9, 1969, Ser. No. 840,318
Claims priority, application Belgium, July 10, 1968, 158,676
Int. Cl. C22b 61/04
U.S. Cl. 23—324    10 Claims

ABSTRACT OF THE DISCLOSURE

The electrically conductive outer cladding of a tubular element is separated from the inner core of the element by cutting the cladding electrochemically using an electrolyte and simultaneously leaching the core material out of the cladding by means of the electrolyte. The electrode used to effect the electrochemical cutting may be hollow and the electrolyte passed through it under pressure. The electrolyte may be of a nature which dissolves the core material. A screen beneath the tubular element catches empty cut sections of the element but allows the electrolyte and the core material to pass through for collection.

---

For some technical uses, products in hermetic conductive coverings or claddings are required, possibly because the clad product requires protection against external agents before use or because a relatively rigid envelope or casing is required for the handling of granular or powdery products, inter alia for the compacting thereof, in some special treatment processes for the products.

Cladding of this kind is widely used for a very wide variety of products in irradiation, more particularly in the case of irradiated nuclear fuels which are in the form of tubular elements comprising an outer jacketing, e.g., of stainless steel or nickel alloys or zirconium or graphite, and an inner furniture comprising uranium oxides. Throughout the following the term "cladding" will be used to denote the outer jacketing and the term "core" will be used to denote the inner furniture, the cladding and the core being combined with one another to form a composite "tubular element."

This invention relates generally to recovering the core of a composite tubular element with the general aim of subsequent use thereof, more particularly the core of an irradiated fuel element for the purpose of processing the uranium and plutonium compounds and the fission products.

The prior art method for this kind of recovery in the case of nuclear fuels is for the tubular elements (which are usually in the form of assemblies of a number of "pencils" or "pins") to be first cross-out, then leached. In this known process, cutting knives cross-cut the tubular elements into short pieces, whereafter the short pieces are leached in an appropriate liquid to dissolve the core material, e.g., sintered uranium oxide. The leaching treatment can be given either in drums rotating with the leaching liquid in countercurrent or in forced-flow leaching baskets or in vibrating tables with a countercurrent flow of liquid.

A process of this kind is bound to have very considerable disadvantages.

First, mechanical cutting causes an undesirable build-up of fine powder from the cladding, and in the case of zirconium and its alloys the powder is also an explosion and fire risk. It is also found that the cutting devices may wear very rapidly, leading to difficult replacement in a nuclear environment; also, shearing tools may seize. As fuel elements become larger, mechanical cross-cutting requires increasingly powerful elements which are not economic.

Leaching of this kind is satisfactory only for relatively short pieces (about 2.5 cm. long), otherwise leaching is incomplete unless used for very long working times. It is found that the working times in the conventional leaching processes become prohibitive unless a certain percentage of unrecovered material can be tolerated. It is also found that in the conventional processes overlong leaching may cause excessive dissolution of the cladding. Before cross-cutting some assemblies, the individual elements or "pencils" must first be disassembled, since mechanical cutting of the complete assembly would crush individual pencils in the cutting region, so that the leaching would be very unsatisfactory.

The technique of electrochemical or "electrolytic" machining is known in the art of machining metal products. With this technique, at least one conductive electrode is placed near the metal workpiece, and the workpiece and electrode are connected to a source of electricity, the workpiece being at a positive potential to the electrode, an electrolyte flowing between the workpiece and the electrode. The electrode and the workpiece therefore form the cathode and anode respectively of an electrolytic cell and material is removed by anode dissolution from the metal member in the zone thereof opposite the electrode.

This invention relates to a novel recovery technique for the core of a tubular element with many advantages, the invention helping more particularly to obviate the disadvantages referred to in connection with nuclear fuel elements.

More precisely, this invention relates to a process for the recovery by leaching of the core of a tubular element of the kind specified, characterised in that electrochemical cutting of the conductive cladding and leaching of the core proceed simultaneously, a single pressure liquid being used both as cutting electrolyte for the cladding and as dynamic leaching agent to vehicle the core. This invention also relates to installations for performing the process.

In some forms of the invention, one or more hollow electrodes is or are used to hurl the pressure liquid directly on each tubular element. In other forms of the invention, one or more electrodes disposed appropriately in relation to the tubular element is or are used, the space between each tubular element and the electrodes being filled by the leaching-agent electrolyte which is maintained at pressure in the space concerned.

The electrolyte used is e.g. NaCl, NaOH, HNO$_3$.

In one very useful form of the process according to the invention, the leaching electrolyte is such as also to have a chemically dissolving effect on the core material by leaching.

More particularly, in the case of an irradiated nuclear fuel element, it is preferred to use a nitric acid solution tending to dissolve the uranium and plutonium compounds and fission products, with the particular effect of dissolving the bonds between such compounds and the outer cladding and of providing total core recovery; conventionally, of course, these compounds must be placed in nitric solution for their subsequent processing.

The invention is very useful in the case of fuel elements comprising bonding to sodium and in the case of fuel elements for fast sodium-cooled reactors.

Other features and advantages of the invention will be disclosed by the following description, reference being made to the accompanying mainly exemplary and non-limitative drawings wherein.

Figure 1:
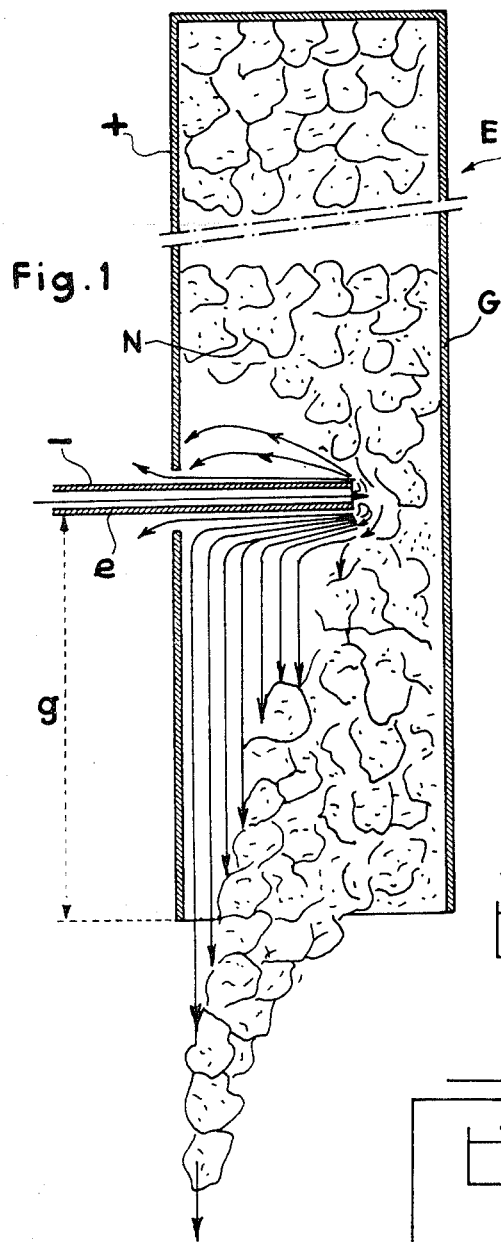
FIGS. 1 and 2 are views, in vertical axial section and in horizontal cross-section respectively, of a tubular element of the kind specified which has been treated in accordance with the invention by a electrolyte simultaneously acting as leaching agent.
Figure 2:
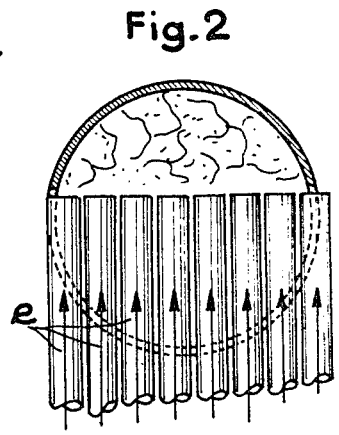

Referring to FIGS. 1 and 2, a tubular element E comprises a conductive outer cladding G and a core N; it is required to separate the core N from the cladding G so as to recover the core N.

To this end, according to the invention, a system of hollow electrodes $e$ is used. In the example shown, the electrodes $e$ take the form of a number of horizontal parallel electrodes—and an electrolyte of the kind specified is forced through the electrodes $e$, the same being maintained at a negative potential to the cladding G. At the start of the operation, the end of the electrodes is kept some distance away from the cladding G; because of the potential difference, and via the pressure electrolyte issuing from the electrodes $e$, electrochemical cutting of the cladding G occurs near the electrodes $e$. The electrode system is gradually moved towards the inside of the tube, and so the electrodes $e$ penetrate into the cladding G, in the manner visible in FIGS. 1 and 2.

According to a main feature of the invention, the pressure electrolyte (at a pressure of from 10 to 20 bars) leaving the electrodes leaches the material of the core N.

Some practical examples of the invention will now be given.

EXAMPLE I

A tubular vertical element having cladding made of 18/8 stainless steel, and an outer diameter of 9 mm. and inner diameter of 7.5 mm. is cut and leached; the tube, which is closed at its top end and open at its bottom end, is filled with alumina powder having a grain size of from 40 to 60 microns at a compacting pressure of 25 bars. The leaching distance $g$ (FIG. 1) chosen is 20 cm. 10 hollow stainless steel electrodes of 1 mm. outer diameter, 0.66 mm. inner diameter and 13 cm. effective length are used.

The electrolyte used is a 200 g./litre common salt solution having a conductivity at 45° C. of 0.185 mho. The pressure upstream of the electrodes is 12 bars and the rate of electrolyte flow is 240 litres/hour. At an applied voltage of 15.5 volts and with an electrode speed of 1.4 mm./min., the tubular element is observed to be completely leached over a distance $g$ of 20 cm. after the hollow electrodes have penetrated 2 mm. inside the tubular element. The height of the cut which 1 mm. outer diameter electrodes make in the metal cladding G is 2.2 mm.

This example shows the great usefulness of the process according to the invention which, it is found, provides very rapid cutting and leaching over considerable leaching distances $g$ (or cutting distances $2g$ between consecutively cut elements). An alumina-powder-filled tube was chosen in conventional manner as a very close simulation of a fuel element. In other experiments made with uncut tubes of this kind filled with granular material, leaching-ejection distances of more than 3 metres were obtained for working pressures of the order of 20 bars.

Of course, carrying the process according to the invention into effect by means of hollow electrodes is just a preferred example of the invention and in a variant one or more solid electrodes can, without departure from the scope of the invention, act on the tubular element provided that there is a flow of pressure electrolyte in the gap between each electrode and the tubular element; one way of achieving this, for instance, it to use a pressure chamber which contains the electrodes and through which the tubular element extends hermetically.

In the particular case of nuclear fuel elements, the preferred electrolyte is nitric acid, since it chemically dissolves the core-forming ingredients, thus facilitating leaching, inter alia as regards sticking to the cladding, and it is a very wise choice so far as subsequent processing —which is conventional—of these ingredients in nitric solution is concerned.

EXAMPLE II

This example relates to the cross-cutting of a nuclear fuel element. The fuel element, which is in shape generally cylindrical, has an outer zirconium cladding whose outer diameter is 12 mm. and whose thickness is 1 mm. and in which natural uranium oxide, $UO_2$, pellets produced by sintering are stacked in contiguous relationship.

The two problems to be solved are cross-cutting the zirconium cladding and dynamically expelling the uranium oxide pellets from the cladding, with the destruction of any uranium oxide deposits sticking to the cladding wall.

Accordingly, a set of 6 hollow cylindrical metal needles forming electrodes is used; the needles have an outer diameter of 1.5 mm. and an inner open diameter of 1.2 mm. and are regularly distributed transversely over a distance of 12 mm. corresponding to the diameter of the element to be cross-cut. The electrolyte used is nitric acid in a concentration of 2 mol per litre and at a temperature of from 70 to 80° C. 30 volts is applied between the zirconium cladding and the electrodes. The hot nitric acid is supplied to the needles at a pressure of 15 bars, which gives a working pressure of about 10 bars inside the cut tubular element during operation.

In these working conditions, completely satisfactory results are obtained at rates of electrode advance of from 2 to 5 mm./min. Cutting of the cladding starts when the end of the electrodes is at 0.2 mm. from the cladding outer surface. The sintered pastilles are ejected when the needles have penetrated a few tenths of a millimeter into the cladding.

In addition to the zirconium cladding being cut cleanly and the $UO_2$ pellets being expelled during the operation, an examination of the cut sections of cladding shows that any $UO_2$ tending to stick to the cladding is removed by dissolving in the hot nitric acid.

Figure 3:
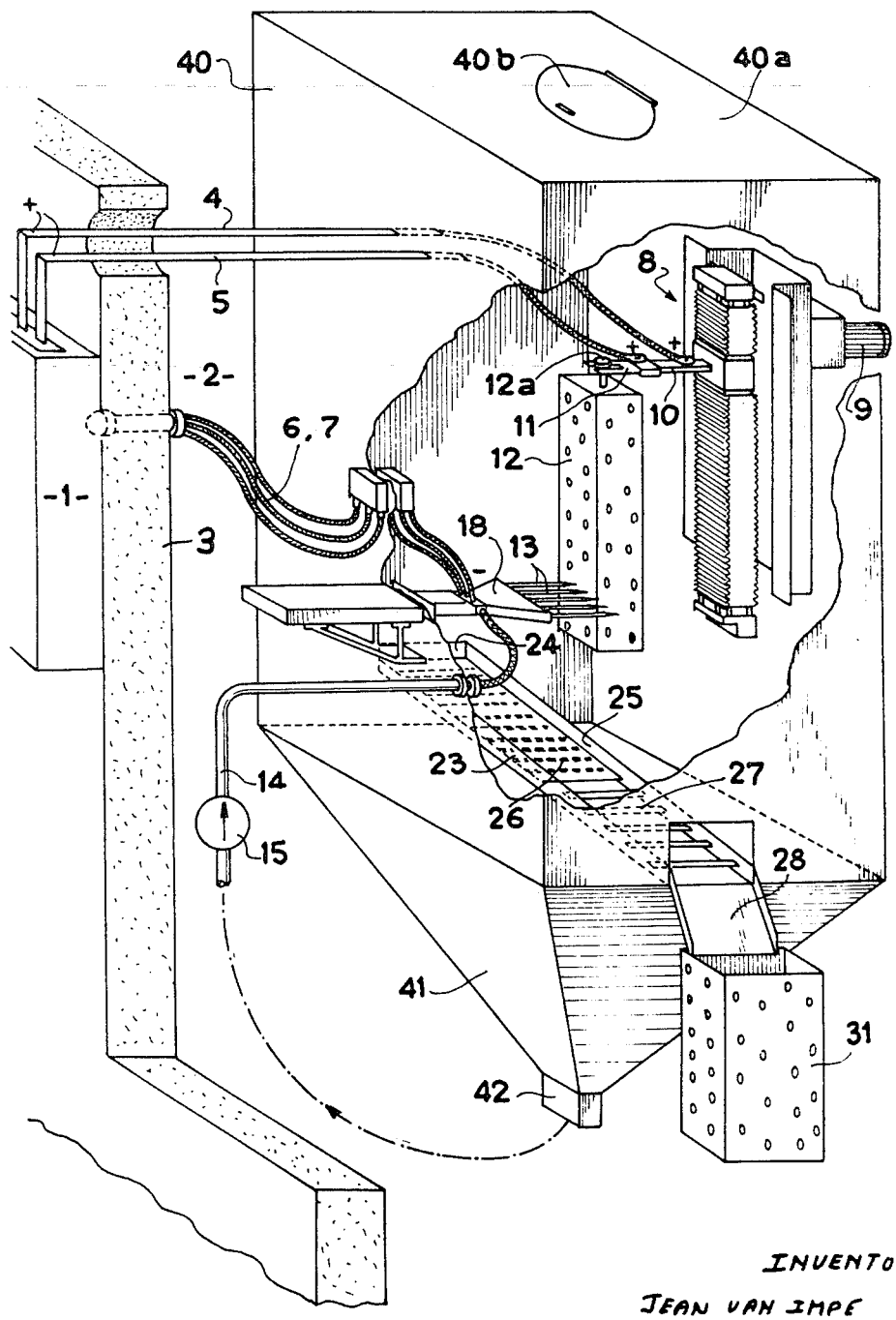
FIG. 3 is a diagrammatic view of an installation for separating the core from the cladding of fuel elements.

FIG. 3 is a diagrammatic view of an installation for cross-cutting and leaching an assembly of nuclear fuel elements. The installation shown comprises an electric generator 1 placed outside a hot cell 2 behind biological shielding 3 which forms one wall of cell 2 and is made e.g. of concrete. Electric cables 4–7 are led through wall 3 in sealing-tight manner and connect generator 1 to that part of the installation which is inside cell 2.

Inside cell 2 is a vertical support system 8 along which a horizontal metal arm 10 can slide. Arm 10 is connected to cables 4, 5 and is associated with an appropriate mechanism, which can be e.g. of the pneumatic piston or hydraulic piston or worm type, for raising and lowering the arm 10; in the example shown a motor 9 drives the mechanism. At the end of arm 10 are grippers 11 providing top support, with the interposition of a handling head 12a, for an assembly 12 of nuclear fuel elements. The items 11, 10 and the mechanism for raising and lowering the arm 10 therefore form a facility for retaining and moving the assembly 12. The generator 1 applies via cables 6, 7 and 4, 5 to the grippers 11 and assembly 12 a positive potential relative to an electrode formed by a set of hollow needles 13.

The hollow needles are disposed in a horizontal plane, since the axes of the tubes forming part of the fuel element assembly 12 suspended from the grippers 11 are vertical, the plane of the needles 13 is perpendicular to the axis of each tube of the assembly 12. The hollow needles 13 are supplied with electrolyte via a circuit 14 comprising a circulating pump 15; a more detailed description of circuit 14 will be given hereinafter. Downstream of pump 15 the electrolyte reaches a pressure of the order of from 5 to 20 kg./cm.$^2$. Circuit 14 delivers to a distribution box 18 which supplies the hollow needles 13 with electrolyte.

Disposed below the needles 13 and fuel element assembly 12 is a screen 23 which has raised edges 24, 25 and slopes downwardly from the end below the needles 13 and the assembly 12 towards the other end. In the top part—i.e., below the needles 13 and assembly 12—the screen base takes the form of a metal sheet 26 pieced with apertures whose diameter is less than the diameter of the tube claddings. Cladding pieces which drop on to the member 26 are therefore retained thereon. The inner portion of the screen base is formed by metal slats 27, at whose end a spillway 28 is disposed. A basket 31 is disposed below the spillway 28 and is pierced with apertures small enough for the waste which it receives to be washed, if so required.

All the elements so far mentioned are received in a box or casing 40 whose top 40a is formed with an aperture which is associated with a cover 40b, and through which the assemblies 12 can be introduced, for instance, with the elements 12 hung on cables by grabs. At the bottom the box 40 takes the form of a collecting hopper 41 below the screen 26 and slots 27; all the liquid products and materials of the core (fuel) which drop off the screen 26 and slats 27 go finally to a collector 42.

The process is carried into effect as follows:

The arm 10, and therefore the tube system 12, are in their top position at the start of operations. The needles 13, which are positioned horizontally, are disposed opposite the assembly 12 at such a height relatively to the bottom surface of the assembly 12 as corresponds to the height of the required sections. In operation the needles 13 are moved regularly towards the element 12 while electrolyte is intaken by pump 15, then hurled in the form of streams by the needles 13 against the assembly 12 at a pressure of the order of from 5 to 20 kg./cm.$^2$. The needles and electrolyte together form an electrolytic cutter. Since the needles 13 are energized via the wiring 6, 7 and 4, 5 at a negative potential to the assembly 12, which is therefore at a relatively positive potential, there is a flow of electric current through the electrolyte between the assembly 12, which forms an anode and the assembly 13, which forms a cathode. The internal cross-section of the needles 13 is, for instance, a few tenths of a millimetre.

Since the needles 13 are disposed in a plane perpendicular to the axes of the tube assembly 12 and since the needle ends are disposed substantially on a straight line, such ends do not intimately follow the outer shape of the tubes but enter thereinto. The fuel in the tubes therefore experiences the hydraulic and electrolytic pressure of the electrolyte. The metal needles penetrate into the assembly by anode dissolution, and the electrolyte thus hurled into the tubes expels therefrom the cores—i.e., the fuels—by hydraulic pressure.

The novel technique provided by the invention has many advantages over the known processes.

The "cuttings" can be appreciably longer than 5 cm., possibly being as long as 50 cm. or more, without impairment of the leaching action, for since the hydraulic pressure can go up to as much as 20 kg./cm.$^2$, a distance of more than 0.5 metre is readily possible for normally stacked materials. Electrolytic cutting does not crush the end ferrules, so that the materials can be ejected readily by the leaching action. By its nature electrolytic cutting does not cause an evolution of pyrophoric dust.

The wear of the cutting needles is almost zero as compared with the wear of the knives used in mechanical cutting processes. Electrolytic needle cutting is devoid of any mechanical movement likely to cause seizures. The violence of the stream of electrolyte issuing from the needles 13 under hydraulic pressure leaches the materials of the assembly 12—i.e., of the nuclear fuels—and losses of materials can be made very small. Leaching time depends solely upon the rate at which the assembly 12 is cut electrolytically and therefore inter alia upon the speed of needle advance, of the hydraulic pressure of the electrolyte, and of the voltage between the assembly 12 and the needle set 13; the leaching time is almost independent of the rate of chemical attack on the fuel. No final metal dust, which may be flammable, accumulates in the bottom of the leaching facilities.

After the bottom part of the fuel assembly 12 has been separated from the top part in a first cross-cutting operation, the arm 10 automatically lowers the top part by an equal amount to the required section length. The zone where it is required to make the next cut therefore comes opposite the needles 13 which form the electrolytic cutter. During cross-cutting, of course, the needles 13 move horizontally, such movement being produced by mechanical means which are integral with the distribution box 18 which are not shown and which can be e.g. of the pneumatic or electric reciprocating actuator type or of the worm type, the latter being driven by a stepping motor. The screen embodied by the metal member 26 and the slatwork 27 receives the electrolyte leaving the needles 13, the fuel vehicled by such electrolyte, and the pieces or sections of cladding. The cladding pieces cannot pass through the apertures in the member 26 or between the slats 27 and therefore go over the spillway 28 into basket 31. If required, the cladding pieces can be given further washing in the basket 31. The electrolyte and fuel vehicled thereby go to collector 42. The electrolyte used in such an installation can be either nitric acid or some other electrolyte, e.g. NaCl or NaOH.

For the rest, the uranium and plutonium compounds and the fission products present in the collector 42 are in one conventional technique placed in nitric solution in a dissolver D ($UO_2$, $PuO_3$, uranium carbides).

Figure 4:
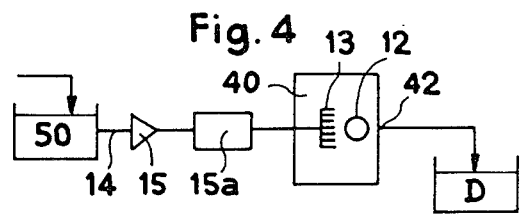
FIGS. 4 and 5 are diagrammatic views of two forms of flow of the working liquid in such an installation.

Two kinds of electrolyte flow are therefore possible:

In a first form (FIG. 4), the electrolyte is nitric acid of the same normality as the dissolver solution; the circuit 14 supplies the hollow needles 13 from a sump 50 via pump 15 and filter 15a. The composite solution of nitric acid and fuel leaving the collector 42 goes directly to the dissolver; the working liquid is not recycled and goes directly to the dissolver.

Figure 5:
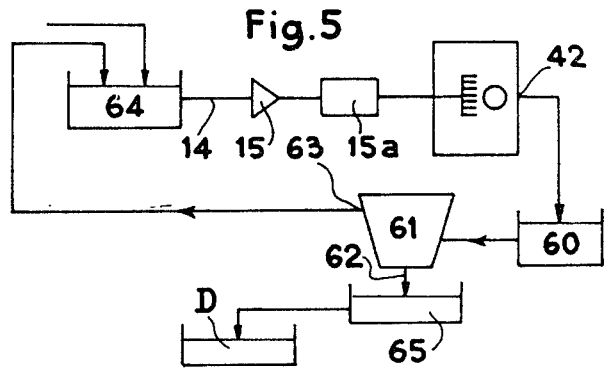

In a second form, in which the electrolyte is not as just set forth, the products of the collector 42 go to a tank 60 and then to a separator 61, for instance, a centrifuge, which separates the sludge (line 62) from the working liquid 63, the same returning to circuit 14 via a buffer sump 64. The sludge goes from the line 62 to a cleaning and washing facility 65, for removal of the last traces of working liquid, then go to the dissolver D to be placed in nitric solution. An installation of this kind is satisfactory, for instance, if the working liquid is common salt. Total or partial recycling of the kind shown in FIG. 5 can also be used in the case of $HNO_3$, the installation not needing any cleaning installation, as 65.

The invention is of use for all nucear fuel elements having an electrically conductive outer cladding and an inner core, in cases in which dynamic leaching and possibly chemical dissolution of all or some of the core is required. The invention is of particular use for fuel elements in which a central metal core, e.g. uranium-niobium, is associated with a conductive outer cladding by way of a sodium bonding layer; in such cases, after the cladding has been cut electrolytically the electrolyte reacts progressively with the sodium and the reaction products are leached out leading to disassembly of the central core and cladding.

It is conventional to use sodium as a cooling medium for fast reactor fuel elements. When such elements (or such element clusters) are processed subsequently, the outer cladding has around it a layer of sodium which must be removed before any core material recovery operation. The invention is very useful in such cases, for the pressure electrolyte is, with advantage, used in a previous phase to clean the elements and remove the sodium; the working liquid then performs three functions, acting as a cleaning liquid, as an electrolyte and as a dynamic leaching agent. This feature must be considered as falling entirely under this invention.

This invention is not of course limited to the embodiment described but covers all variants in line with the underlying idea of the invention. More particularly, with regard to the installation, the fuel assembly 12 can move in any direction and not just vertically; the assembly 12 can be stationary and the needles 13 can be movable parallel to it. Also, the assembly 12 can be stationary and a combined cutting and leaching system can be devised which comprises a number of needles sets distributed in a number of different cutting planes. With regard to the electrodes, a system comprising a number of hollow electrodes disposed in parallel to one another has been described in the foregoing as a preferred form, but without departure from the scope of the invention a single electrode can be used which has a large active front area and which is formed with a number of orifices for the electrolyte streams. Nor is it essential for satisfactory performance of the process according to the invention that the working pressure of the electrolyte remain constant throughout operations; in some cases temporary pressure boosts may apparently be helpful in the dynamic leaching of the core. Similarly, varying the voltage between the tubular element and the or each electrode during working falls under this invention, as does also the use, with electrodes of a noble metal, e.g. platinum, of voltage reversals to produce in known manner depassivation effects. As a rule, of course, the cladding need not be cut completely (into different discrete sections), and merely notching the cladding may be sufficient. The fuel element may be a thorium one (thorium oxyde).

What is claimed is:

1. A process for totally recovering the inner core of a tubular nuclear fuel element having an electrically conductive outer cladding, comprising the steps of placing near the tubular element an electrochemical cutting device movable relative to the tubular element providing a small working gap between the cutting device and the tubular element; connecting the tubular element outer cladding and the cutting device to an electric circuit so that the cutting device is at a negative potential relative to the tubular element; passing pressurized electrolyte through the cutting device into the working gap; moving the cutting device and the tubular element relative to each other to produce gradual cutting of the cladding by electrolytic action; applying the pressurized electrolyte through the cutting device to the core material during continued movement of the cutting device, the electrolyte pressure being such that during this movement the electrolyte dynamically expels the core material, which is therefore carried out of the cladding with the electrolyte; and collecting the core/electrolyte mixture and the voided cladding separately.

2. A process as set forth in claim 1 wherein the electrolyte has a chemically dissolving effect on the core material.

3. A process as set forth in claim 1 wherein the electrolyte is directed towards the tubular element in the form of small streams.

4. A process as set forth in claim 1 wherein the electrolyte flows in a working chamber in which the working gap is disposed and which is arranged hermetically between the cutting device and the tubular element.

5. A process as set forth in claim 1 wherein the tubular element is a nuclear fuel element whose core contains compounds of at least one metal selected from the group consisting of uranium, plutoninum, and thorium, and the major part of the electrolyte is nitric acid.

6. A process as set forth in claim 5 including the step of passing the mixture of the nitric acid and core constituents which it has expelled directly to a dissolver wherein the material contained in the core passes into nitric solution.

7. A process as set forth in claim 1 including the step of separating the electrolyte from the core material and collecting the latter.

8. A process for totally recovering the inner core of a tubular nuclear fuel element having an electrically conductive outer cladding, said core containing compounds of at least one metal selected from the group consisting of uranium, plutonium, and thorium; said process comprising the steps of placing near the tubular element an electrochemical cutting device movable relative to the tubular element providing a small working gap between the cutting device and the tubular element; connecting the tubular element outer cladding and the cutting device to an electric circuit so that the cutting device is at a negative potential relative to the tubular element; passing pressurized electrolyte through the cutting device into the working gap, the major part of said electrolyte being nitric acid; moving the cutting device and the tubular element relative to each other to produce gradual cutting of the cladding by electrolytic action, the electrolyte pressure being such that during this movement the electrolyte dynamically expels the core material, which is therefore carried out of the cladding with the electrolyte; collecting the core/electrolyte mixture and the voided cladding separately, and passing the mixture of said nitric acid and core constitutents which it has expelled directly to a dissolver wherein the material contained in the core passes into nitric solution.

9. A process for totally recovering the inner core of a tubular nuclear fuel element having an electrically conductive outer cladding, the core being connected to the cladding by sodium bonding, said process comprising the steps of placing near the tubular element an electrochemical cutting device movable relative to the tubular element providing a small working gap between the cutting device and the tubular element; connecting the tubular element outer cladding and the cutting device to an electric circuit so that the cutting device is at a negative potential relative to the tubular element; passing pressurized electrolyte through the cutting device into the working gap; moving the cutting device and the tubular element relative to each other to produce gradual cutting of the cladding by electrolytic action, the electrolyte pressure being such that during this movement the electrolyte first reacts on the sodium of the bonding so that the cladding separates from the core and then dynamically expels the core material, which is therefore carried out of the cladding with the electrolyte; and collecting the core/electrolyte mixture and the voided cladding separately.

10. A process for totally recovering the inner core of a tubular nuclear fuel element having an electrically conductive outer cladding, the cladding having an outer layer of sodium, said process comprising the steps of placing near the tubular element an electrochemical cutting device movable relative to the tubular element providing a small working gap between the cutting device and the tubular element; connecting the tubular element outer cladding and the cutting device to an electric circuit so that the cutting device is at a negative potential relative to the tubular element; passing pressurized electrolyte through the cutting device into the working gap to remove the sodium outer layer; moving the cutting device and the tubular element relative to each other to produce gradual cutting of the cladding by electrolytic action, the electrolyte pressure being such that during this movement the electrolyte dynamically expels the core material, which is therefore carried out of the cladding with the electrolyte; and collecting the core/electrolyte mixture and the voided cladding separately.

References Cited

UNITED STATES PATENTS

| | | | |
|---|---|---|---|
| 2,872,394 | 2/1959 | Newman | 23—324 |
| 3,058,895 | 10/1962 | Williams | 204—143 |
| 3,060,114 | 10/1962 | Sanders | 204—224 |
| 3,130,138 | 4/1964 | Faust et al. | 204—143 |
| 3,145,078 | 8/1964 | Strickland et al. | 23—324 |

REUBEN EPSTEIN, Primary Examiner

U.S. Cl. X.R.

204—143 R, 143 M, 224, 1.5